July 7, 1970 C. JANISZEWSKI 3,519,122
CONVEYOR STOP MEANS FOR DISHWASHING MACHINE
Filed Jan. 15, 1968 2 Sheets-Sheet 1
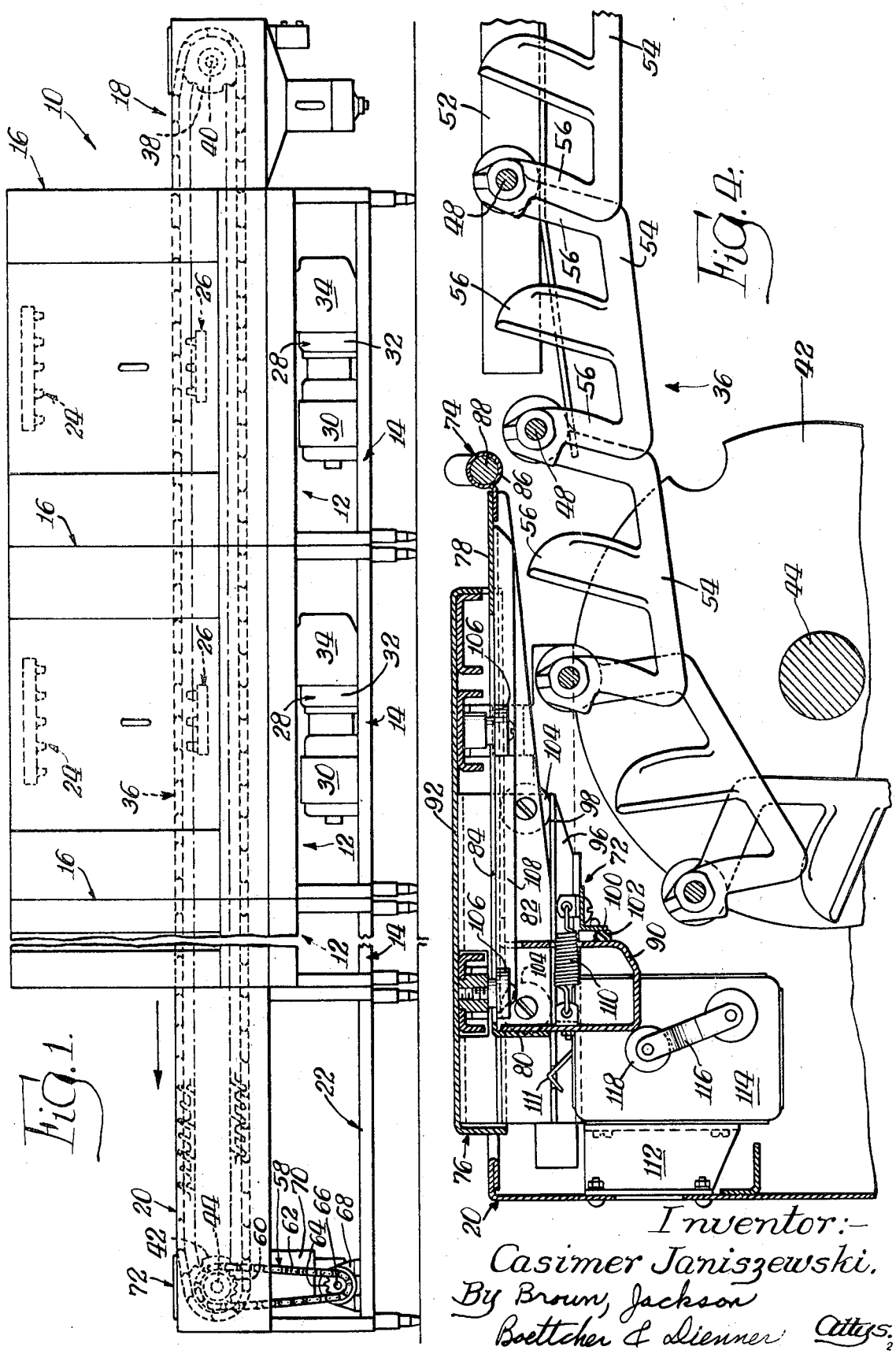
Inventor:—
Casimer Janiszewski.
By Brown, Jackson
Boettcher & Dienner Attys.

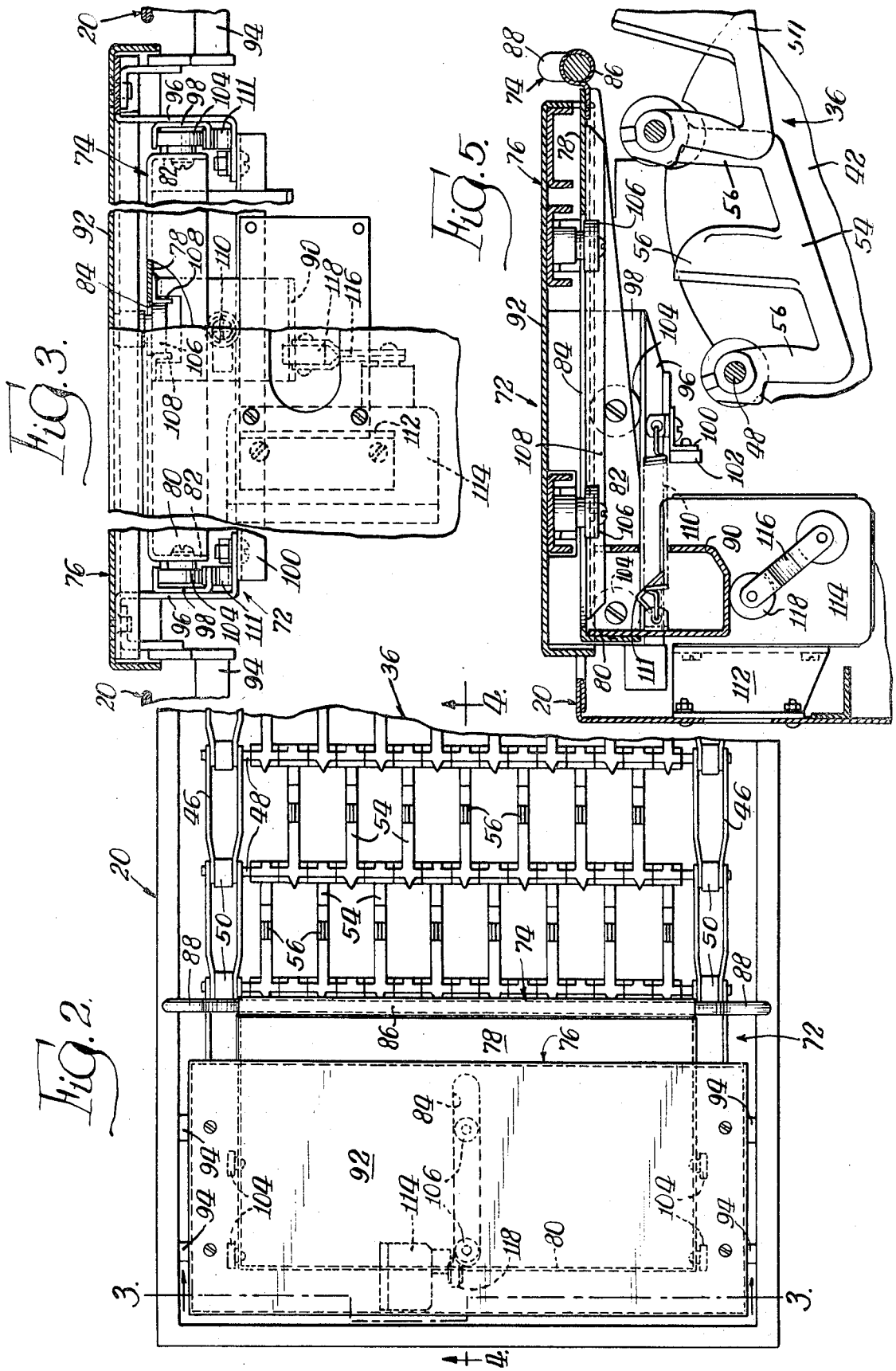

United States Patent Office

3,519,122
Patented July 7, 1970

3,519,122
CONVEYOR STOP MEANS FOR DISHWASHING MACHINE
Casimer Janiszewski, Chicago, Ill., assignor to G. S. Blakeslee & Co., Cicero, Ill., a corporation of Delaware
Filed Jan. 15, 1968, Ser. No. 698,037
Int. Cl. B65g 43/08
U.S. Cl. 198—232                                     7 Claims

ABSTRACT OF THE DISCLOSURE

Stop means for the endless conveyor means of a dishwashing machine wherein actuator means is located at the unloading end of the conveyor and is movable rectilinearly in a horizontal path longitudinally of the conveyor means, either upon engagement by an article moving with the conveyor means, or manually, to stop the conveyor means.

BACKGROUND OF THE INVENTION

Field of the invention

The present invention pertains generally to commercial dishwashing machines of the flight conveyor type which are used extensively in restaurants, hospitals and like establishments, and more particularly to automatically or manually operable stop means for interrupting the drive means of the conveyor, for example, in emergency situations.

Description of the prior art

In a flight conveyor type dishwashing machine, dishes and other articles are inserted manually, at the loading end of the machine, between the flights or links of an endless conveyor, or are loaded into racks which are supported on the top surface of the conveyor. These articles are moved by the conveyor through the machine between various sets or pairs of upper and lower spray means so as to be subjected to washing and rinsing operations. At the unloading end of the machine, the articles are adapted to be removed manually from the conveyor. Occasionally, the operator at the unloading end of the machine fails to remove in good time finally washed and rinsed dishes or other articles.

To prevent jamming of the conveyor and breakage of articles in these circumstances, various arrangements for automatically stopping the conveyor have heretofore been proposed. However, prior stop arrangements have not proved entirely satisfactory. For example, one such arrangement has comprised the provision of pivotally mounted trip fingers and elements which project between the links of the upper run of the conveyor and which are engageable by articles moved by the conveyor. This arrangement is not as simple to construct and assemble, and is not as inexpensive, as might be desirable. Furthermore, it does not lend itself to manual operation when required.

SUMMARY OF THE INVENTION

In accordance with the present invention, actuator means, which is normally disposed in an inactive position, is provided at the unloading end of the conveyor. The actuator means is supported for limited rectilinear movement in a horizontal path longitudinally of the conveyor, and is movable from the inactive position upon engagement by an article moving with the conveyor to effect interruption of the conveyor drive means. More particularly, the actuator means comprises a generally rectangular panel member which is supported by a generally rectangular stationary apron and cooperating roller and guide means arranged between the apron and the panel member.

Additionally, hand engageable means is provided on the panel member at the forward end portion thereof whereby to accommodate manual movement of the panel member from the inactive position to selectively effect interruption of the conveyor drive means, and latch means is provided for releasably retaining the panel member away from the inactive position whereby to selectively maintain interruption of the drive means.

In connection with the described conveyor stop means, fabrication and assembly are simplified, efficiency in operation is improved, and optional automatic and manual operation is permitted.

BRIEF DESCRIPTION OF THE DRAWINGS

FIG. 1 is a side elevational view, foreshortened in part of a flight conveyor type of dishwashing machine in which the present invention is embodied;

FIG. 2 is a partial plan view, on an enlarged scale, of the unloading end of the dishwashing machine of FIG. 1, illustrating the conveyor stop means of the present invention;

FIG. 3 is a sectional view, on a further enlarged scale and foreshortened in part, taken substantially along the line 3—3 in FIG. 2, looking in the direction indicated by the arrows;

FIG. 4 is a sectional view, on a further enlarged scale, taken substantially along the line 4—4 in FIG. 2, looking in the direction indicated by the arrows; and FIG. 5 is a sectional view, corresponding generally to FIG. 4 on a reduced scale, but illustrating the stop means actuated to stop the conveyor.

DESCRIPTION OF THE PREFERRED EMBODIMENT

Referring now to FIG. 1, there is indicated generally by the reference numeral 10 a flight conveyor type dishwashing machine with which the conveyor stop means of the present invention is adapted to be incorporated. The dishwashing machine 10 includes a series of similar sections 12 assembled and secured together endwise. Each section 12 comprises a base frame 14 and an open ended generally rectangular housing 16 supported thereby. Extending from the right-hand end of the series of sections 12, as viewed in FIG. 1, is a housing 18; and extending from the left-hand end of the series of sections 12 is a housing 20 supported by a base frame 22. The sections 12, housings 18 and 20, and base frame 22 constitute the general framework of the dishwashing machine 10.

Suitably mounted within the housings 16 are upper and lower spray boxes 24 and 26 from which sprays or jets of water or washing solution are projected downwardly and upwardly as dishes or other articles to be washed are moved through the machine. Also, mounted on each base frame 14 is a motor-pump unit 28 comprising an electric motor 30, a rotary impeller pump 32 driven thereby and having an outlet connected to the adjacent spray boxes 24 and 26 for delivering liquid under pressure thereto, and a sump chamber 34 which communicates with the bottom of the housing 16 and also with the inlet of the pump 32 for supplying liquid thereto.

Arranged lengthwise of the machine is conveyor means comprised of an endless conveyor 36 at one end trained about sprocket wheels 38 secured on a shaft 40 rotatably mounted in the housing 18 and at the other end trained about sprocket wheels 42 secured on a shaft 44 rotatably mounted in the housing 20. As shown in FIG. 2, the conveyor 36 comprises side chains 46 connected by cross rods 48 having at the ends thereof rollers 50 which are suitably guided by track sections 52 (FIG. 4) mounted in the housings 16 and which are adapted to be received in recesses or notches provided in the sprockets 38 and 42. The cross rods 48 of the conveyor 36 provide support for, and are interconnected by, flights or links 54 of substantially W-shape extending inwardly between the runs of the conveyor and each having three outwardly extending fingers 56.

As shown in FIG. 1, there is provided conveyor drive means 58 which comprises a sprocket gear 60 secured on the shaft 44. A sprocket chain 62 is trained over the sprocket gear 60 and a sprocket pinion 64 secured on the drive shaft 66 of a speed reducer 68 mounted on the base frame 22 and driven by an electric motor 70. The sprockets 42 are driven in a counterclockwise direction, as viewed in FIG. 1, and the upper run of the conveyor 36 travels from right to left. It will be appreciated that the various components of the dishwashing machine 10 may be rearranged for operation of the conveyor 36 in the opposite direction.

The general dishwashing machine 10 is similar to that disclosed in the copending application of John Cumming, Ser. No. 574,427, filed Aug. 23, 1966, now Pat. No. 3,468,320; the motor-pump units 28 are similar to that disclosed in Patent No. 3,108,607, issued on Oct. 29, 1963, to David G. Blakeslee; and the conveyor 36 is similar to that disclosed in Pat. No. 3,086,641, issued on Apr. 23, 1963, to John Cumming. For further details concerning the above-described apparatus, which is not per se part of the present invention, reference may be had to the aforesaid copending application and patents.

Referring now to FIGS. 1–4, there is indicated generally by the reference numeral 72 the conveyor stop means of the preesnt invention which is arranged at the unloading end of the conveyor 36. The conveyor stop means 72 comprises actuator means 74 and supporting and guide means 76 therefor.

The actuator means 74 includes a generally rectangular panel member 78 having a downturned rear end portion 80, downturned side portions 82 and a central longitudinal slot 84. A tubular member 86 is suitably secured along the forward end of the panel member 78, and hand engageable rod members 88, with upwardly offset outer end portions, are secured in the ends of the tubular member 86. Secured to the rear end portion 80 and underside of the panel member 78 is a depending switch actuator frame 90.

The supporting means 76 includes a generally rectangular stacking apron 92 which overlies the panel member 78 and which is secured at its sides to the housing 20 by means of bracket assemblies 94. Depending from the apron 92 are Z-shaped brackets 96 to which are secured longitudinal guide elements or C-shaped channel members 98 and a transverse brace 100 provided with resilient bumper means 102. Longitudinally spaced roller members 104 are rotatably mounted on horizontal axes to the sides 82 of the panel member 78 and are engageable at their outer peripheries with the channel members 98. Longitudinally spaced roller members 106 are also rotatably suspended on vertical axes from the apron 92 and are engageable at their outer peripheries with longitudinal guide elements or flanges 108 secured to the underside of the panel member 78 along the sides of the slot 84.

The above-described cooperating roller and guide means serve to support and guide the actuator means 74 for limited rectilinear movement in a horizontal path longitudinally of the conveyor 36. The actuator means 74 is normally biased to the inactive position shown in FIGS. 2 and 4 by means of a spring 110 connected between the switch actuator frame 90 and the transverse brace 100. Forward movement of the actuator means 74 is limited by engagement of the frame 90 with the bumper means 102. A spring latch 111 is secured to each of the Z-shaped brackets 96 and projects upwardly through a slot provided in each of the channel members 98. When the actuator means 74 is moved to the rearward position shown in FIG. 5, the rearward roller members 104 ride over the spring latches 111 and the actuator means 74 is thereby releasably maintained in the position shown in FIG. 5.

Mounted to the housing 20 by means of a bracket 112 is a micro-switch 114 having a switch arm 116 with a roller 118 at the outer end thereof. The switch arm 116 is spring loaded and cooperates with the spring 110 in normally biasing the actuator means 74 to the inactive position shown in FIGS. 2 and 4. The switch 114 is connected in the electrical circuit of the motor 70. When the actuator means 74 is moved rearwardly from the position shown in FIG. 4, the frame 90 engages the roller 118 and pivots the switch arm 116 to open the switch 114. In this manner, the motor 70 is deenergized and the conveyor drive means 58 is interrupted to stop the conveyor 36.

In practice the conveyor 36 is loaded with articles to be washed at the right-hand end of the machine, as viewed in FIG. 1, and articles that have been washed are unloaded from the conveyor at the left-hand end. More particularly, plates and other articles of flatware are inserted edgewise and transversely of the upper run of the conveyor into the links 54 of the upper run thereof while the latter is travelling toward the unloading end of the machine. Smaller articles such as cups, glasses, cutlery, and the like are placed in open work baskets or racks which are set upon the upper run of the conveyor. During travel of the articles through the machine, they are subjected to washing and rinsing operations, and are thereafter removed from the conveyor, during continued travel thereof, at the unloading end.

All articles of flatware should be removed from the conveyor before they reach the stop means 72. In the event a piece of flatware is not removed from the upper run of the conveyor 36 in good time, in the continued travel of the conveyor the flatware will contact the front end of the actuator means 74 and move the same rearwardly from the inactive postion shown in FIG. 4. The switch 114 is thereby opened and the conveyor drive means 58 is interrupted to stop the conveyor 36 in the manner previously described. When the article contacting the actuator means 74 is removed from the conveyor 36, the spring 110 restores the actuator means 74 to the inactive position shown in FIG. 4 and operation of the conveyor 36 is resumed.

Whenever desired or required, an operator may also interrupt the conveyor drive means 58, to stop the conveyor 36 by grasping either of the handles 88 and manually moving the actuator means 74 rearwardly from the inactive position shown in FIG. 4. When the actuator means 74 is moved rearwardly to the position shown in FIG. 5, the spring latches 111, as previously described, serve to releasably retain the actuator means 74 away from the inactive position to selectively maintain interruption of the conveyor drive means 58. To restore operation of the conveyor 36, the operator need only grasp either of the handles 88 and manually move the actuator means 74 forwardly until the rearward roller members 104 ride back over the spring latches 111 at which time the spring 110 will return the actuator means 74 to the inactive position shown in FIG. 4.

While there has been shown and described a preferred embodiment of the present invention, it will be understood by those skilled in the art that various rearrangements and modifications may be made therein without departing from the spirit and scope of the invention.

What is claimed is:

1. In a dishwashing machine including framework, endless conveyor means for moving articles to be washed through the machine and presenting a loading end and an unloading end, and drive means for the conveyor means, the improvement of conveyor stop means which comprises actuator means at the unloading end of the conveyor and normally disposed in an inactive position, said actuator means comprising a horizontal generally rectangular panel member having a forward end portion overlying the unloading end of the conveyor means in the path of travel of articles being moved by the conveyor means, means supporting said actuator means for limited rectilinear movement in a horizontal path longitudinally of the conveyor means, said actuator means being movable from said inactive position upon engagement by an article moving with the conveyor means to effect interruption of the drive means, said supporting means comprising a horizontal generally rectangular apron secured to the framework at the unloading end of the conveyor in overlying relationship to said panel member, and cooperating roller and guide means between said apron and said panel member.

2. The improvement of claim 1 wherein said cooperating roller and guide means comprises longitudinal guide elements on said panel member, and longitudinally spaced roller members rotatably suspended on vertical axes from said apron and being engageable at their outer peripheries with said guide elements.

3. The improvement of claim 1 wherein said cooperating roller guide means comprises longitudinal guide elements suspended from said apron along each side of said panel member, and longitudinally spaced roller members rotatably mounted on horizontal axes on said panel member at each side of and being engageable at their outer peripheries with said guide elements.

4. The improvement of claim 1 including spring means biasing said panel member to said inactive position.

5. The improvement of claim 1 including means on said panel member at the forward end portion thereof engageable by hand whereby to accommodate manual movement of said panel member from said inactive positive position to selectively effect interruption of the drive means.

6. The improvement of claim 5 including latch means for releasably retaining said panel member away from said inactive position whereby to selectively maintain interruption of the drive means.

7. The improvement of claim 1 including a switch actuator frame rigidly secured to the underside of and depending from said panel member, and switch means operable by said switch actuator frame when said panel member is moved from said inactive position to effect interruption of the drive means.

References Cited

UNITED STATES PATENTS

| | | |
|---|---|---|
| 2,644,473 | 7/1953 | Fox et al. |
| 2,986,268 | 5/1961 | Robson et al. _____ 198—232 |

ROBERT G. SHERIDAN, Primary Examiner

U.S. Cl. X.R.

134—46